United States Patent
Joung

(10) Patent No.: US 6,775,836 B2
(45) Date of Patent: Aug. 10, 2004

(54) DEVICE FOR OPENING AND CLOSING LID OF OPTICAL DISK PLAYER

(75) Inventor: Il-Kweon Joung, Ansan-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 203 days.

(21) Appl. No.: 10/179,891

(22) Filed: Jun. 26, 2002

(65) Prior Publication Data

US 2003/0174626 A1 Sep. 18, 2003

(30) Foreign Application Priority Data

Mar. 13, 2002 (KR) ........................................ 2002-13604

(51) Int. Cl.[7] ........................ G11B 33/02; A45C 13/12
(52) U.S. Cl. ...................................... 720/639; 206/1.5
(58) Field of Search ................ 720/639; 369/75.11; 70/78–80, 102, 159; 206/1.5

(56) References Cited

U.S. PATENT DOCUMENTS 4,694,362 A * 9/1987 Oosaka et al. ........... 360/99.06

FOREIGN PATENT DOCUMENTS

JP 58158073 * 9/1983
JP 09091937 * 4/1997

* cited by examiner

Primary Examiner—George J. Letscher
(74) Attorney, Agent, or Firm—Morgan, Lewis & Bockius LLP

(57) ABSTRACT

A device for opening and closing a lid of an optical disk player is disclosed, which is intended to decrease manufacturing cost, to improve assembling efficiency and productivity, and to minimize rejection rate of products by reduction of components. The device includes a player body having a button and a locking hole, a lid hingedly coupled to an end of the player body to cover the player body, and biased upwardly by a spring, the lid having a hook projected downwardly, a pickup disposed in the player body to be moved back and forth, and provided with a pusher, a catcher disposed in the player body to be moved back and forth, and having a catching protrusion to be engaged with the hook and a contact plate to be in contact with the pusher, and having a connecting rod connected between the catching protrusion and the contact plate, and a spring disposed in the player body to bias the catcher forwardly.

11 Claims, 5 Drawing Sheets

DEVICE FOR OPENING AND CLOSING LID OF OPTICAL DISK PLAYER

BACKGROUND OF THE INVENTION

1. Field of the Invention

The present invention relates to an optical disk player, and more particularly to a device for opening and closing a lid of an optical disk player, which is adapted to easily open a lid by using a pickup disposed in a player body.

2. Description of the Prior Art

In general, an optical disk player serves to write or read data to or from a disk, and can be currently divided into three types of a tray disk type, a caddy type and a lid type.

As shown in FIG. 1, the lid type of optical disk player is constructed in such a way that a lid 20 is hingedly coupled to a player body 10 provided therein with a pickup 30 so that the lid 20 can be opened and closed with respect to the player body 10.

FIGS. 2 and 3 show a conventional device for opening and closing a lid of an optical disk player.

As depicted in FIGS. 1 to 3, the lid 20, which is hingedly coupled to the player body 10 at its rear end, is provided at a side of its front end with a hook 22 extended downwardly, and the player body 10 is provided with a locking hole 12 at a position corresponding to the hook 22. The player body 10 is also provided with a catcher 40 at the inside of the locking hole 12, which is selectively engaged with the hook 22.

In the conventional optical disk player, the lid 20 is biased to the opened position by a spring (not shown).

The catcher 40 is formed at one end with a connecting hole 42 which is fitted on a center pin 43 such that the catcher 40 can be rotated about the center pin 43. The other end of the catcher 40 is provided with a catching protrusion 44 having a slanted surface inclined downwardly.

A solenoid 50 is formed at rear end of the catcher 40 and a rod of solenoid 52 is coupled to rear end of the catcher 40 so that the catcher 40 can be selectively rotated.

In other words, when the solenoid 50 is supplied with electric current, the rod 52 is retracted rearwardly, thus pulling the catcher 40 rearwardly. On the other hand, when the supply of the current to the solenoid 50 is stopped, the rod 52 is extended forwardly by restoring force of a spring 54 surrounding the rod 52, thereby allowing the catcher 40 to be restored to the normal position.

In this connection, the player body 10 is provided at its front portion with a button 14. Upon pressing the button 14, the solenoid 50 is supplied with electric current. Releasing of the button 14 stops the supply of current to the solenoid 50.

The catcher 40 is provided at its lower surface with a support shaft 46 extended downwardly. A lower end of the support shaft 46 comes into close contact with a bottom surface of the player body 10, thereby preventing the catcher 40 from drooping down.

Furthermore, A limit plate 48 is disposed below the catcher 40 in order to prevent the catcher 40 from being rotated beyond a certain rotating range as the catcher 40 is rotated about the center pin 43.

The limit plate 48 is disposed in the player body 10 with a spacing therebetween, and is provided with a curved side surface 48a along which the support shaft 46 is guided.

In an operation of the conventional device, when the lid 20 is closed, the hook 22 of the lid 20 is inserted into the locking hole 12 of the player body 10, and presses the catching protrusion 44 of the catcher 40 while sliding on the slant surface of the catching protrusion 44.

Therefore, the catching protrusion 44 of the catcher 40 is moved rearwardly and thus rotated about the center pin 43 by the pressure. When the lid 20 is completely closed, the catching protrusion 44 is moved forwardly by the restoring force of the spring 54 and then engages with the hook 22, thereby enabling the lid 20 to be maintained in the closed position.

In order to open the lid 20, the button 14 provided on the player body 10 is pressed. Upon pressing the button 14, the solenoid 50 is supplied with electric current to retract the rod 52, thereby pulling and rotating the catcher 40 rearwardly. As the catcher 40 is rotated, the catching protrusion 44 is released from the engagement with hook 22, so that the lid 20 is opened upwardly by restoring force of a spring.

When a user's finger releases the button 14, the electric current being supplied to the solenoid 50 is interrupted, so that the catcher 40 is rotated and restored to the normal position by restoring force of the spring 54.

However, since a conventional device for opening and closing a lid requires a number of electric and mechanical components, manufacturing cost of products is increased, and considerable attention must be paid to selection of the various components in the design of products.

Furthermore, since a number of components are required in manufacturing the device, assembling efficiency and productivity are decreased. In addition, rejection rate of products is increased due to tolerances of components, and thus quality of products is deteriorated.

Moreover, since a conventional device for opening and closing a lid includes a catcher disposed in a player body, a space required for operation of the catcher must be added to the player body, thereby increasing dimensions of the player body.

SUMMARY OF THE INVENTION

Accordingly, the present invention has been made keeping in mind the above problems occurring in the prior art, and an object of the present invention is to provide a device for opening and closing a lid of an optical disk player, which is intended to decrease manufacturing cost of products and to improve assembling efficiency and productivity by reduction of components, and which is intended to minimize rejection rate of products by improvement of product quality.

In order to accomplish the above object, the present invention provides a device for opening and closing a lid of an optical disk player, comprising: a player body provided at its side portion with a button and provided at its upper surface with a locking hole; a lid which is hingedly coupled to an end of the player body to selectively cover the player body, and is biased upwardly by a spring, the lid being provided with a hook projected downwardly therefrom at a location corresponding to the locking hole of the player body; a pickup disposed in the player body to be moved back and forth, which is provided at its side with a pusher extended laterally; a catcher disposed in the player body to be moved back and forth, which is provided at its front end with a catching protrusion to be engaged with the hook and provided at its rear end with a contact plate to be in contact with the pusher, and which includes a connecting rod connected between the catching protrusion and the contact plate; and a spring disposed in the player body to bias the catcher forwardly.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

This invention will be described in further detail by way of example with reference to the accompanying drawings.

Figure 1:
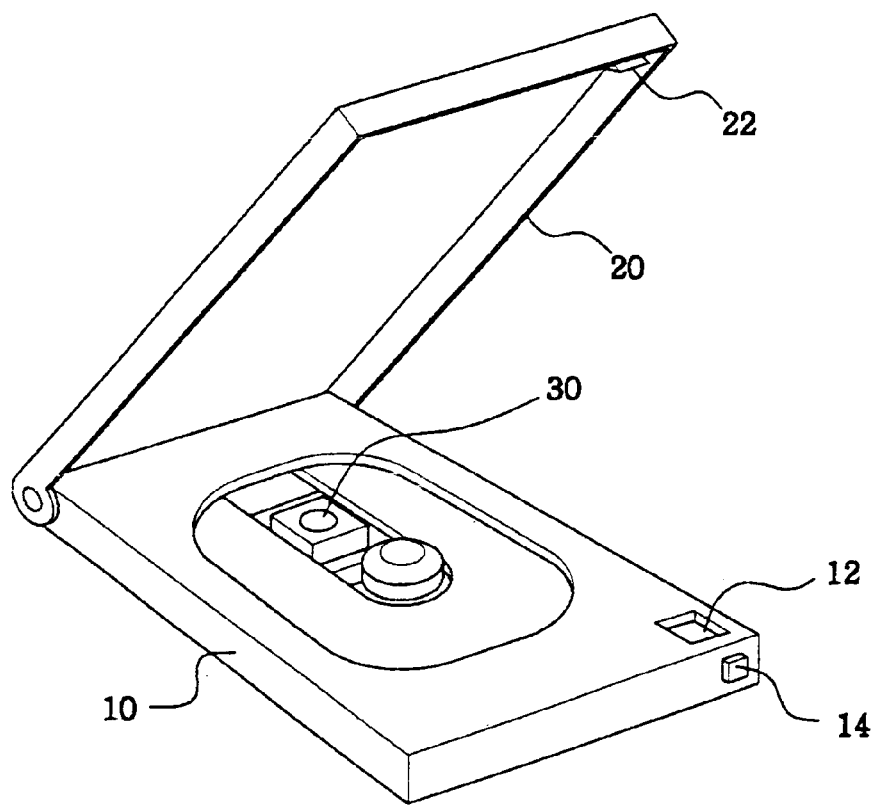
FIG. 1 is a perspective view showing a conventional optical disk player.
Figure 2:
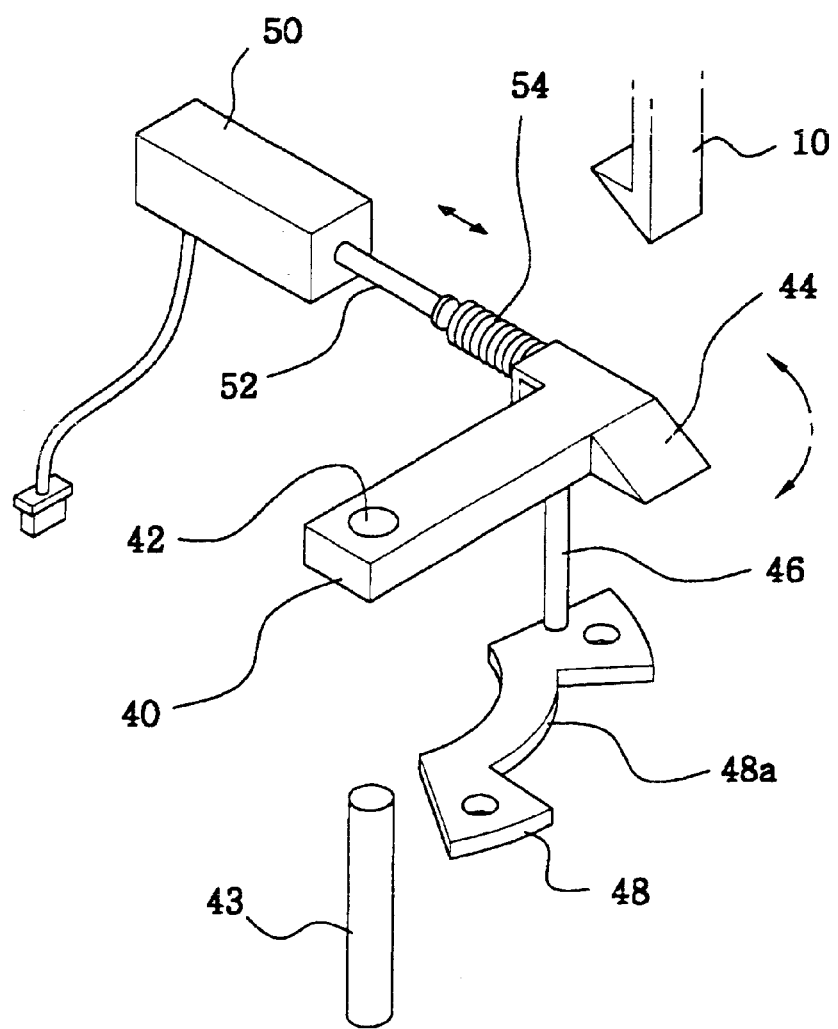
FIG. 2 is an exploded perspective view showing a conventional device for opening and closing a lid of an optical disk player.
Figure 3:
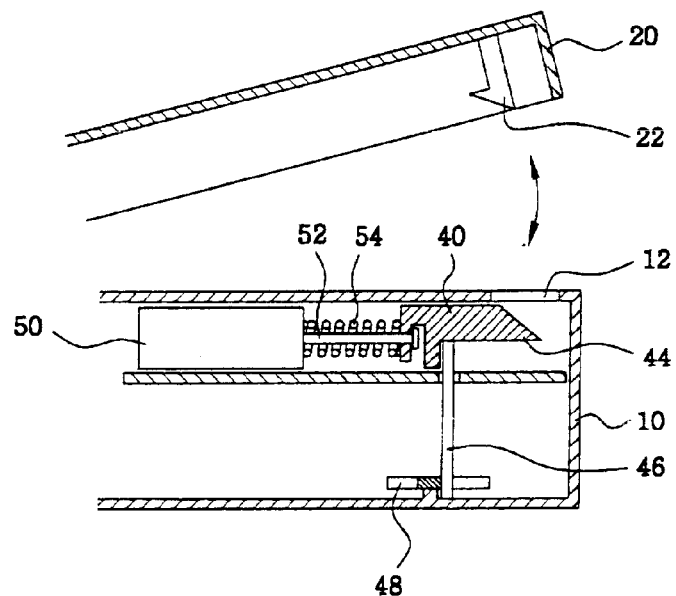
FIG. 3 is a cross-sectional view showing a conventional device for opening and closing a lid of an optical disk player.
Figure 4:
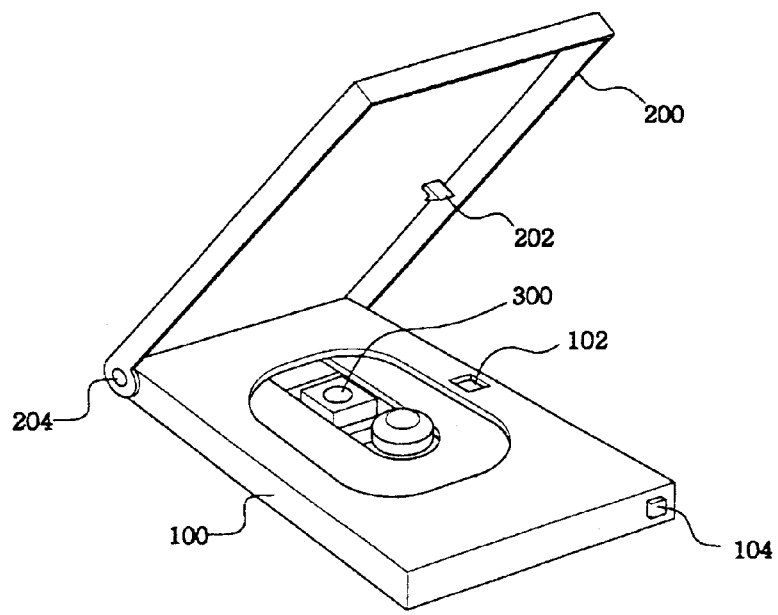
FIG. 4 is a perspective view showing an optical disk player to which the present invention is applied.

As shown in FIG. 4, an optical disk player to which the present invention is applied is comprised of a player body 100 and a lid 200 adapted to be selectively opened and closed.

In other words, the lid 200 is hingedly coupled to an end of the player body 100 by hinge elements 204 so that the lid 200 is rotated about the hinge elements 204 to open or close the player body. The lid 200 is also provided with a hook 202 downwardly protruded therefrom.

Between the player body 100 and the lid 200 is commonly provided a spring (not shown) such that the lid 200 is upwardly biased with respect to the player body 100 and is thus upwardly rotated.

The player body 100 is provided therein with a pickup 300, which is adapted to be radially moved on a disk. The player body 100 is also provided at its upper surface with a locking hole 102 corresponding to the hook 202, and is provided at its front end with a button 104, which is electrically connected to a control unit which operates the pickup 300 to further move away from the center of the disk by a certain distance in a state of the optical disk player being stopped.

Although it is preferable that the locking hole 102 and the hook 202 are positioned at a middle portion of a side of the player body 100 and the lid 200, the locking hole 102 and the hook 202 may be positioned at a front portion of the player body 100 and the lid 200.

Figure 5:
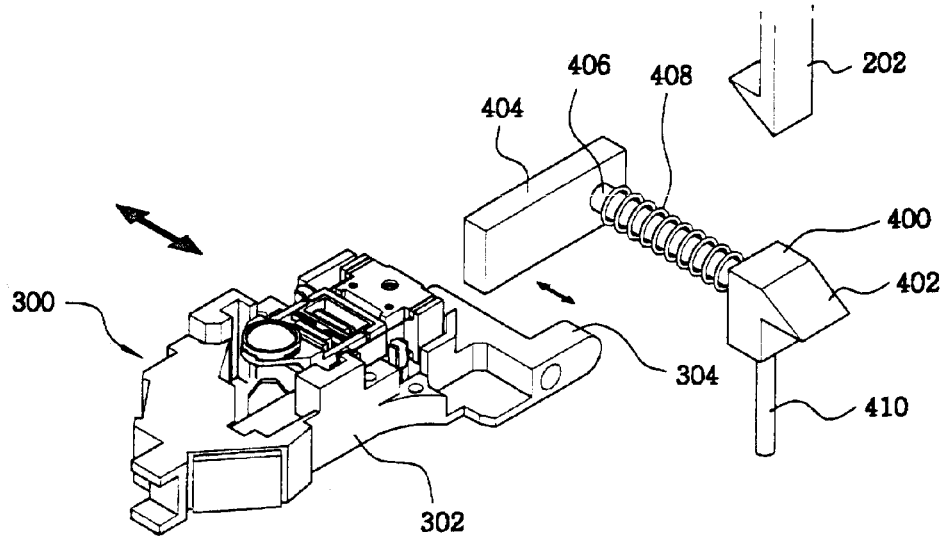
FIG. 5 is a an exploded perspective view showing a device for opening and closing a lid of an optical disk player according to the present invention.
Figure 6:
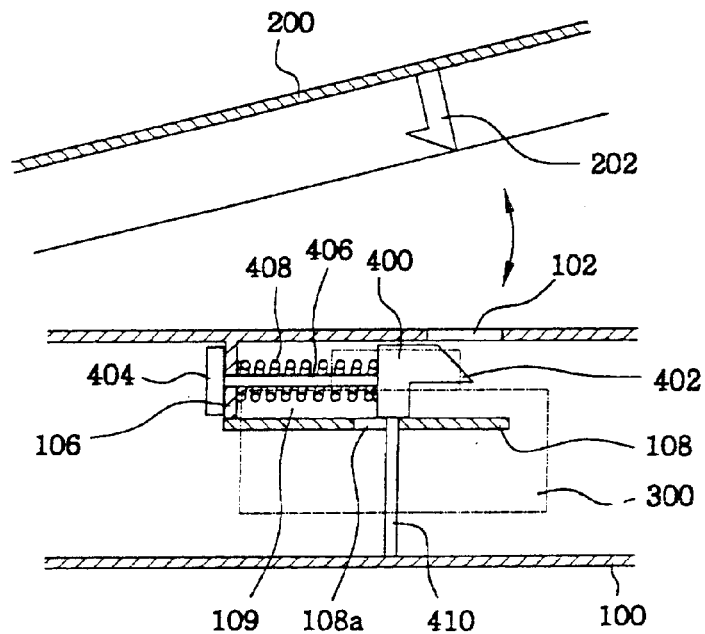
FIG. 6 is a cross-sectional view showing a device for opening and closing a lid of an optical disk player to the present invention.

Referring to FIGS. 5 and 6, the pickup 300 is usually supported at its base 302 by primary and secondary shafts (not shown) and is moved back and forth along the shafts. Furthermore, the base 302 is provided at its side with a pusher 304 extended laterally.

The player body 100 is provided with a catcher 400 below the locking hole 102, which is engaged with the hook 202 of the lid 200 to retain the lid 200 in the closed position.

The catcher 400 is provided at its front end with a catching protrusion 402, and provided at its rear end with a contact plate 404 extended laterally. The contact plate 404 comes into contact with the pusher 304 of the pickup 300 when the pickup 300 moves rearwardly. The catching protrusion 402 and the contact plate 404 are connected to each other by a connecting rod 406. The catching protrusion 402 includes a slanted surface downwardly inclined such that the hook 202 can be easily caught by the catching protrusion 402.

The catcher 400 is biased forwardly by a spring 408. More specifically, the player body 100 is provided therein with a catcher-receiving space 109, which is defined by a horizontal base plate 108 and a vertical support plate 106 provided at a rear end of the base plate 108, such that the catcher 400 is moved back and forth in the catcher-receiving space 109.

The connecting rod 406 of the catcher 400 passes through the support plate 106 such that the contact plate 404 is positioned at the outside of the catcher-receiving space 109. The connecting rod 406 is inserted into the spring 406 such that the spring 406 is supported by the support plate 106 and elastically biases the catcher 400 forwardly.

Furthermore, the catcher 400 is provided at its lower surface with a support shaft 410, which is extended downwardly and is in contact with the bottom surface of the player body 100. The base plate 108 defining the catcher-receiving space 109 is formed with a guide hole 108a for limiting a range of movement of the support shaft 410.

Functions of the device according to the present invention will now be described.

In a closing operation of the lid 200 of the optical disk player, the lid 200 is pressed downwardly by user's fingers and then is held in close contact with the player body 100.

Figure 7A:
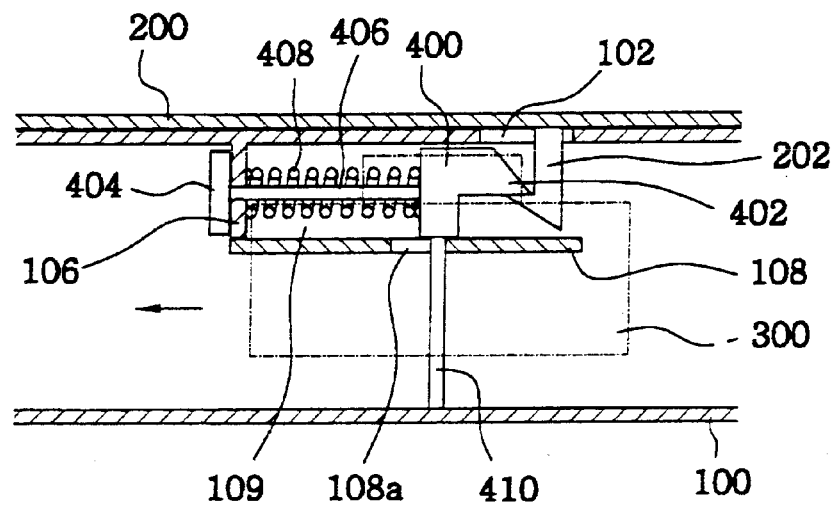
FIGS. 7a, 7b are operating views showing the device according to the present invention.

At this point, the hook 202 of the lid 200 is inserted into the locking hole 102 of the player body 100. Subsequently, the catching protrusion 402 of the catcher 400 is pressed rearwardly while compressing the spring 406 by downward movement of the hook 202. When the lid 200 reaches its completely closed position, the catching protrusion 402 is forwardly moved to its normal position by restoring force of the spring 406, and thus engaged with the hook 202. Therefore, the lid 200 is maintained in the closed position, as illustrated in FIG. 7a.

In order to open the lid 200, the button 104 provided at the player body 100 is pressed by a user's finger.

Figure 7B:
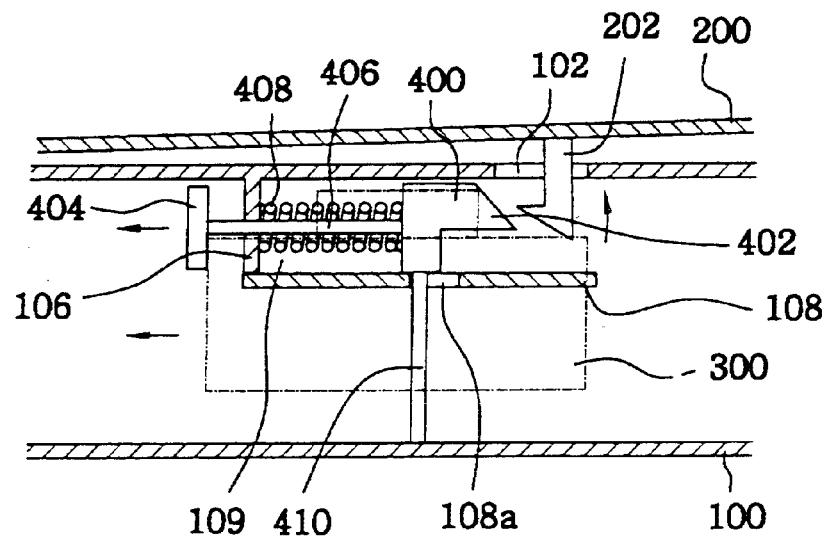

Upon pressing the button 104, the pickup 300 is rearwardly moved to a location slightly beyond its usual moving limit point by electric action, as illustrated in FIG. 7b. During the rearward movement of the pickup 300, the pusher 304 of the pickup 300 comes into contact with the contact plate 404 and then pushes that rearwardly. Accordingly, the catcher 400 is moved rearwardly while compressing the spring 406.

By so doing, the catching protrusion 402 is disengaged from the hook 202, so that the lid 200 is rotated upwardly and thus opened by restoring force of the spring.

After the lid 200 is opened, the pickup 300 is forwardly moved to its normal position, and at the same time the catcher 400 is also forwardly moved to its normal position.

Although the pusher of the pickup base 302 is configured to come into contact with the contact plate 404, the contact plate 404 may be further extended laterally to come into direct contact with the pickup base 402.

As such, since rearward movement of the pickup causes the catcher to be moved rearwardly, it is not necessary to provide additional components such as a solenoid for moving the catcher. Therefore, the number of components required to constitute the device for opening and closing a lid of an optical disk player is remarkably reduced.

In other words, since reduction of the number of components results in reduction of manufacturing cost, improvement of assembling efficiency and productivity, and minimization of rejection rate of products, quality of products is considerably improved and competitiveness and reliability of products are improved. Moreover, by reduction of the number of components, configuration and design of the device are simplified and thus a period of time necessary to develop the device is shortened.

In addition, since the catcher of the device is linearly moved back and forth, a space for allowing the movement of the catcher is reduced. Therefore, an internal space in the player body can be efficiently utilized, and stable operation of the device can be achieved.

As described above, the present invention provides a device for opening and closing a lid of an optical disk player, which is comprised of a reduced number of components, thereby achieving reduction of manufacturing cost, improvement of assembling efficiency and productivity, and minimization of rejection rate of products by its simplified configuration, and improving competitiveness and reliability of products.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for opening and closing a lid of an optical disk player, comprising:
   a player body provided at its side portion with a button and provided at its upper surface with a locking hole;
   a lid which is hingedly coupled to an end of the player body to selectively cover the player body, and is biased upwardly by a spring, the lid being provided with a hook projected downwardly therefrom at a location corresponding to the locking hole of the player body;
   a pickup disposed in the player body to be moved back and forth, which is provided at its side with a pusher extended laterally;
   a catcher disposed in the player body to be moved back and forth, which is provided at its front end with a catching protrusion to be engaged with the hook and provided at its rear end with a contact plate to be in contact with the pusher, and which includes a connecting rod connected between the catching protrusion and the contact plate; and
   a spring disposed in the player body to bias the catcher forwardly.

2. The device as set forth in claim 1, in which when the button is pressed in a state of the optical disk player being stopped, the pickup is further moved away from the center of a disk by a certain distance, and thus the pusher of the pickup pushes the contact plate of the catcher rearwardly, thereby causing the catching protrusion to be disengaged from the hook of the lid.

3. The device as set forth in claim 1, in which the catcher is provided at its lower surface with a support shaft, which is extended downwardly and comes into contact with a bottom surface of the player body.

4. The device as set forth in claim 1, in which the player body is provided with a support plate through which the connecting rod of the catcher passes and by which the spring inserted on the connecting rod is supported at its rear end to bias the catcher forwardly.

5. The device as set forth in claim 1, in which the catching protrusion includes an upper slanted surface inclined forwardly and downwardly.

6. A device for opening and closing a lid of an optical disk player, comprising:
   a player body provided with a locking hole;
   a lid which is hingedly coupled to an end of the player body to selectively cover the player body, and is biased upwardly by a spring, the lid being provided with a hook projected downwardly therefrom at a location corresponding to the locking hole of the player body;
   a pickup disposed in the player body to be radially moved on a disk;
   a catcher disposed in the player body, which is provided at its front end with a catching protrusion to be engaged with the hook and provided at its rear end with a contact plate to be in contact with the pusher, and which includes a connecting rod connected between the catching protrusion and the contact plate; and
   a spring disposed in the player body to bias the catcher forwardly.

7. The device as set forth in claim 6, in which when the button is pressed in a state of the optical disk player being stopped, the pickup is further moved away from the center of a disk by a certain distance, and thus the pickup pushes the contact plate of the catcher rearwardly, thereby causing the catching protrusion to be disengaged from the hook of the lid.

8. The device as set forth in claim 6, in which the catcher is provided at its lower surface with a support shaft, which is extended downwardly and comes into contact with a bottom surface of the player body.

9. The device as set forth in claim 6, in which the player body is provided with a support plate through which the connecting rod of the catcher passes and by which the spring inserted on the connecting rod is supported at its rear end to bias the catcher forwardly.

10. The device as set forth in claim 6, in which the pickup is mounted on a pickup base, which is supported by primary and secondary shafts in the player body and moved back and forth therealong, the pickup base being in contact with the contact plate of the catcher during its movement.

11. A device for opening and closing a lid of an optical disk player having a player body and a lid hingedly coupled to the player body to selectively cover the player body, which includes a hook disposed in the lid and a catcher disposed in the player body so that the lid is maintained in its closed position by engagement of the hook and the catcher, wherein
   when the button provided at the player body is pressed in a state of the optical disk player being stopped, the pickup, which is disposed in the player body and radially moved on a disk, is further moved away from the center of a disk by a certain distance, and thus the pickup pushes the catcher, thereby causing the catcher to be disengaged from the hook of the lid.

* * * * *